No. 884,523.
PATENTED APR. 14, 1908.
J. C. PRIMS.
ROASTER.
APPLICATION FILED SEPT. 23, 1907.
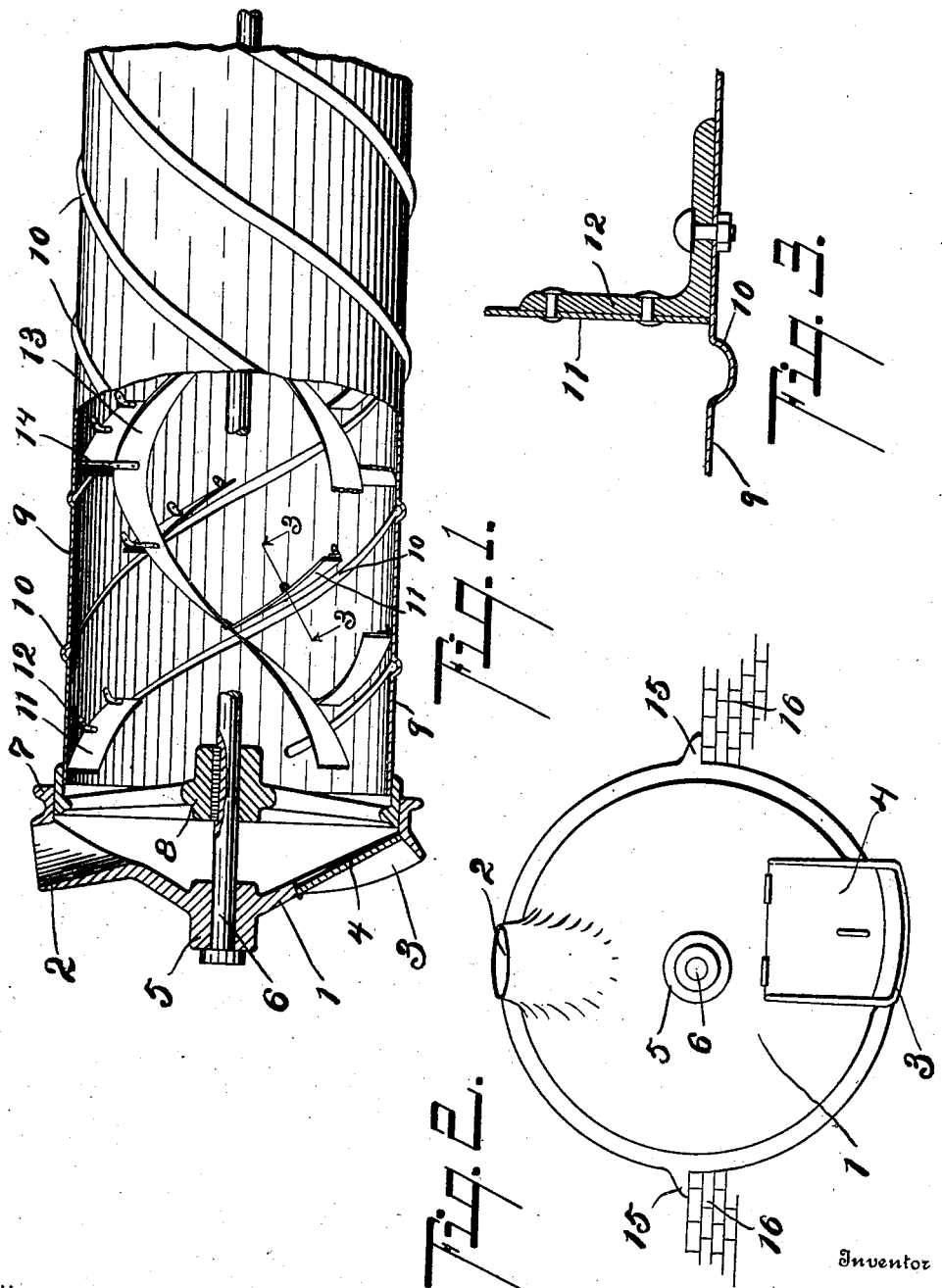

UNITED STATES PATENT OFFICE.

JOSEF C. PRIMS, OF BATTLE CREEK, MICHIGAN, ASSIGNOR TO J. C. PRIMS MACHINERY COMPANY, OF BATTLE CREEK, MICHIGAN.

ROASTER.

No. 884,523.  Specification of Letters Patent.  Patented April 14, 1908.

Application filed September 23, 1907. Serial No. 394,171.

*To all whom it may concern:*

Be it known that I, JOSEF C. PRIMS, a citizen of the United States, residing at Battle Creek, county of Calhoun, State of Michigan, have invented certain new and useful Improvements in Roasters, of which the following is a specification.

This invention relates to improvements in roasters.

The main objects of this invention are to provide in a roaster an improved roasting cylinder by which the material is kept properly agitated and is carried into and delivered from the cylinder, and one which is not injuriously affected by the heat.

Another object is to provide an improved cylinder-head adapted to form a bearing support for the said cylinder and to receive and deliver material.

Further objects, and objects relating to details of construction, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing forming a part of this specification, in which:

Figure 1 is a detail side elevation of a structure embodying the features of my invention, it being shown partially in longitudinal section; Fig. 2 is a front elevation of my improved roaster; and Fig. 3 is an enlarged detail section taken on a line corresponding to line 3—3 of Fig. 1.

Referring to the drawing: the head 1 is preferably a casting and is provided with an inlet 2 and a discharge 3, the discharge 3 being provided with a suitable downwardly-closing door 4. The discharge is located mainly at the side of the central line of the cylinder to more effectively deliver the material.

The head is provided with a central bearing 5 for the shaft 6 and with a rearwardly-projecting flange-like bearing 7 for the cylinder-wheel 8.

The cylinder 9 is preferably formed of sheet metal and is connected to the wheel 8 to revolve therewith, the wheel being secured to the shaft. The cylinder 9 is provided with a plurality of spiral corrugations 10, forming spiral grooves on the inside of the cylinder. Along the rear edges of these grooves I arrange a series of outer conveyer-blades 11, said blades being arranged in overlapping series so that as the cylinder is revolved the material therein is conveyed or carried forward by these blades. The blades are secured in position by suitable bracket-pieces 12, as clearly appears from the drawing.

By providing the cylinder with the spiral corrugations 10 the expanding and contracting, due to the heating and cooling of the cylinders, is taken care of so that the conveyer-blades are not affected thereby, and so that the shell or cylinder is not injuriously affected from the uneven heating and expanding of the cylinder.

I also provide a set of inner conveyer-blades, as 13, which are preferably continuous, as illustrated, that is, they extend spirally about the cylinder from end to end and are arranged within the outer blades, their outer edges being in substantially the same plane as that of the inner edges of the outer blades, so that in operation the material being introduced through the inlet opening 12 is carried first to the rear of the cylinder by the blades 13 and thence to the front or delivery end of the cylinder by the blades 11, it being necessary, of course, that a sufficient quantity of material be introduced into the cylinder so that its depth shall exceed the width of the outer blades. This is effective in economizing the heat, as the material is first heated as it passes rearwardly through the cylinder and properly heated or toasted as it passes forwardly therein in contact with or close to the walls of the cylinder.

I preferably arrange the corrugating so that it will form the internal grooves, as they do not in any way affect the carrying forward of the material.

The blades 13 are preferably supported by bearings 14 which also serve as one of the supporting-brackets for the blades 11.

The head 1 is also preferably provided with outwardly projecting ears 15, adapted to rest on the wall 16 of the furnace, the head not being otherwise connected therewith, so that it can readily adjust itself to the contracting and expanding of the parts.

I have in the accompanying drawing shown my device in detail in the form preferred by me on account of its structural simplicity and economy. I am aware, however, that it is capable of being considerably varied in structural details without departing from my invention.

Having thus described my invention, what I claim as new and desire to secure by Letters Patent is:

1. In a structure of the class described, the combination of a cylinder formed of sheet metal, said cylinder being provided with spiral corrugations forming internal spiral grooves therein; outer conveyer-blades arranged in overlapping series, secured along the edges of said corrugations; continuous spiral inner conveyer-blades, arranged within said outer blades, at the forward ends thereof, the outer edges of said inner blades being in substantially the same plane as the inner edges of said outer blades; and means for revolubly supporting said cylinder.

2. In a structure of the class described, the combination of a cylinder formed of sheet metal, said cylinder being provided with spiral corrugations; outer conveyer-blades arranged in overlapping series, secured along the edges of said corrugations; continuous spiral inner conveyer-blades, arranged within said outer blades at the forward ends thereof, the outer edges of said inner blades being in substantially the same plane as the inner edges of said outer blades; and means for revolubly supporting said cylinder.

3. In a structure of the class described, the combination of a cylinder formed of sheet metal, said cylinder being provided with spiral corrugations forming internal spiral grooves therein; outer conveyer-blades arranged in overlapping series, secured along the edges of said corrugations; continuous spiral inner conveyer-blades, arranged within said outer blades, the outer edges of said inner blades being in substantially the same plane as the inner edges of said outer blades; and means for revolubly supporting said cylinder.

4. In a structure of the class described, the combination of a cylinder formed of sheet metal, said cylinder being provided with spiral corrugations; outer conveyer-blades arranged in overlapping series, secured along the edges of said corrugations; continuous spiral inner conveyer-blades, arranged within said outer blades, the outer edges of said inner blades being in substantially the same plane as the inner edges of said outer blades; and means for revolubly supporting said cylinder.

5. In a structure of the class described, the combination of a cylinder formed of sheet metal, said cylinder being provided with spiral corrugations forming internal spiral grooves therein; outer conveyer-blades arranged in overlapping series, secured along the edges of said corrugations; continuous spiral inner conveyer-blades, arranged within said outer blades at the forward ends thereof; and means for revolubly supporting said cylinder.

6. In a structure of the class described, the combination of a cylinder formed of sheet metal, said cylinder being provided with spiral corrugations; outer conveyer-blades arranged in overlapping series, secured along the edges of said corrugations; continuous spiral inner conveyer-blades, arranged within said outer blades; and means for revolubly supporting said cylinder.

7. In a structure of the class described, the combination of a cylinder formed of sheet metal, said cylinder being provided with spiral corrugations forming internal spiral grooves therein; outer conveyer-blades arranged in overlapping series, secured along the edges of said corrugations; continuous spiral inner conveyer-blades, arranged within said outer blades at the forward ends thereof; and means for revolubly supporting said cylinder.

8. In a structure of the class described, the combination of a cylinder formed of sheet metal, said cylinder being provided with spiral corrugations; outer conveyer-blades arranged in overlapping series, secured along the edges of said corrugations; continuous spiral inner conveyer-blades, arranged within said outer blades; and means for revolubly supporting said cylinder.

9. In a structure of the class described, the combination of a cylinder formed of sheet metal, said cylinder being provided with spiral corrugations forming internal spiral grooves therein; outer conveyer-blades arranged in overlapping series, secured along the edges of said corrugations; and means for revolubly supporting said cylinder.

10. In a structure of the class described, the combination of a cylinder formed of sheet metal, said cylinder being provided with spiral corrugations; outer conveyer-blades arranged in overlapping series, secured along the edges of said corrugations; and means for revolubly supporting said cylinder.

In witness whereof, I have hereunto set my hand and seal in the presence of two witnesses.

JOSEF C. PRIMS. [L. S.]

Witnesses:
O. S. CLARK,
GEO. H. ABELL.